US010124375B2

(12) United States Patent
Casey et al.

(10) Patent No.: US 10,124,375 B2
(45) Date of Patent: *Nov. 13, 2018

(54) PIPELINE HYDRATE INHIBITOR AND METHOD OF REDUCING HYDRATES USING THE HYDRATE INHIBITOR

(71) Applicant: BAKER HUGHES INCORPORATED, Houston, TX (US)

(72) Inventors: Gregory E. Casey, Humble, TX (US); Angel Hoover, Tomball, TX (US); Andrew J. Barden, Bellaire, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 71 days.

This patent is subject to a terminal disclaimer.

(21) Appl. No.: 15/085,717

(22) Filed: Mar. 30, 2016

(65) Prior Publication Data

US 2016/0207080 A1    Jul. 21, 2016

Related U.S. Application Data

(63) Continuation of application No. 13/271,070, filed on Oct. 11, 2011, now Pat. No. 9,328,302.

(60) Provisional application No. 61/407,115, filed on Oct. 27, 2010.

(51) Int. Cl.
| | | |
|---|---|---|
| *C09K 8/86* | (2006.01) |
| *B08B 9/04* | (2006.01) |
| *C09K 8/52* | (2006.01) |
| *C10L 3/10* | (2006.01) |
| *E21B 37/06* | (2006.01) |
| *F16L 58/00* | (2006.01) |
| *C10L 1/188* | (2006.01) |

(52) U.S. Cl.
CPC ............... *B08B 9/04* (2013.01); *C09K 8/52* (2013.01); *C10L 3/107* (2013.01); *E21B 37/06* (2013.01); *F16L 58/00* (2013.01); *C09K 2208/22* (2013.01); *C10L 1/1881* (2013.01); *Y10T 137/0435* (2015.04)

(58) Field of Classification Search
CPC ...... C09K 8/86; C09K 8/845; C09K 2208/22; C09K 8/52; C09K 8/04; C09K 8/08; C09K 8/528; C09K 2208/20; C09K 8/508; C09K 8/512; C09K 8/584; C09K 8/594; C09K 8/602; C09K 8/94; E21B 36/04; E21B 43/2401; E21B 43/24; E21B 43/30; E21B 43/243; E21B 44/02; E21B 47/02216; E21B 43/16; E21B 10/003; E21B 19/08; E21B 21/08; E21B 36/001; E21B 36/02; E21B 3/00; E21B 43/119; E21B 47/022; E21B 47/06; E21B 4/04; E21B 7/068; E21B 7/18; E21B 37/06; E21B 41/02; E21B 43/01; E21B 43/121; E21B 43/34
See application file for complete search history.

(56) References Cited

U.S. PATENT DOCUMENTS

| | | | |
|---|---|---|---|
| 1,866,560 A | 7/1932 | Gordan | |
| 4,602,920 A | 7/1986 | Diaz et al. | |
| 5,846,450 A | 12/1998 | Atkinson | |
| 7,093,655 B2 * | 8/2006 | Atkinson | ............... C09K 8/665 166/266 |
| 9,328,302 B2 * | 5/2016 | Casey | ...................... C09K 8/52 |
| 2008/0314124 A1 * | 12/2008 | Sweeney | .................. F17D 1/05 73/49.5 |
| 2009/0067931 A1 | 3/2009 | Curr et al. | |
| 2010/0163255 A1 | 7/2010 | Horton et al. | |
| 2010/0227781 A1 | 9/2010 | Tej et al. | |

FOREIGN PATENT DOCUMENTS

| | | |
|---|---|---|
| WO | WO09818542 | 5/1998 |
| WO | WO03029612 | 4/2003 |

OTHER PUBLICATIONS

Flow Assurance, Weatherford International Ltd., 2009, 2 pgs., http://www.weatherfor.com/weatherford/groups/public/documents/engineeredchemistry/ec_flowassurance.hcsp.
Addressing Deepwater Challenges, Weatherford W Magazine, May 2008, 32 pgs., vol. 10 No. 2, Weatherford International Ltd.
US Patent and Trademark Office; Office Action issued in U.S. Appl. No. 13/271,070 dated Mar. 12, 2015.
US Patent and Trademark Office; Office Action issued in U.S. Appl. No. 13/271,070 dated Oct. 1, 2015.
UK Intellectual Property Office; Search Report issued in GB Patent Application No. GB1117859.7 dated Jan. 13, 2012.
IP Australia; Examination Report for Patent Application No. 2011235996 dated Feb. 2, 2016.
UK Intellectual Property Office; Examination Report for Application No. GB1117859.7; dated Jun, 8. 2016.

* cited by examiner

*Primary Examiner* — Kumar R Bhushan
(74) *Attorney, Agent, or Firm* — Parsons Behle & Latimer

(57) ABSTRACT

Compositions and methods for reducing the formation of hydrates within subsea or over-land pipeline systems. The compositions and methods include the use of organic salt solutions, such as an acetate salt solution, to precondition, treat, and/or dewater the pipeline systems, or employ the use of the organic salt solutions during other pre-commissioning operations. An effective concentration of an organic salt solution acts to reduce hydrates and/or inhibit hydrate formation within the pipeline systems.

11 Claims, No Drawings

PIPELINE HYDRATE INHIBITOR AND METHOD OF REDUCING HYDRATES USING THE HYDRATE INHIBITOR

RELATED APPLICATION DATA

The present application is a continuation under 35 U.S.C. § 120 of U.S. patent application Ser. No. 13/271,070, filed Oct. 11, 2011, which claims the benefit of priority under 35 U.S.C. § 119 to U.S. Provisional Application No. 61/407,115 filed Oct. 27, 2010, both entitled "Pipeline Hydrate Inhibitor and Method of Reducing Hydrates Using the Hydrate Inhibitor," and both of which are incorporated herein by reference.

BACKGROUND

Field of the Disclosure

The present disclosure relates generally to a method and composition for reducing hydrate formation and more particularly to reducing hydrate formation using organic salts.

Description of the Related Art

After construction and deployment of pipelines, manifolds, and stations (generally referred to herein as pipelines and pipeline systems), water is typically present within the pipelines from cleaning, flooding, hydrotesting, and/or other pre-commissioning operations. Hydrotesting typically includes filling a pipeline system with water and pressurizing the water to verify the integrity of the pipeline system.

The presence of bulk and/or residual water is a normal result of such pre-commissioning activities. After pre-commissioning activities are completed, remaining water is commonly removed from the pipelines prior to commencing service to avoid formation of hydrates, which can result from interactions between water and production fluids. For example, if natural gas is pumped through a pipeline that has water in it, under certain conditions the methane, isobutane, and/or other various components in the natural gas may interact with the water to form hydrates within the pipeline. Generally, colder ambient temperatures, such as those found within subsea pipeline systems, may promote hydrate formation. Such hydrates may partially or completely block the flow of production fluid through pipeline systems. Hydrate remediation or removal can be time-consuming and expensive.

One method that has been commonly used to mitigate hydrate formation includes removing bulk water in the pipeline by pushing one or more pipeline pigs down the pipeline. Pipeline pigs displace bulk water from the pipelines, but may leave residual water on the inside surfaces of the pipeline. Even residual water may result in the formation of hydrates in pipeline systems.

One known method employed to remove residual water from pipelines comprises using vacuum pumps to evaporate the water. The vacuum pumps lower the air pressure within the pipeline to below the vapor pressure of water at the ambient temperature, which causes the water to evaporate and allows for removal of the water vapor from the pipeline.

One known method of hydrate prevention includes pumping various solutions known to inhibit hydrate formation into a pipeline. Known hydrate-inhibiting solutions include formate salt solutions, methanol, and ethylene glycol. U.S. Patent Application Publication No. 2008/0314124 to Sweeny et al., titled "Composition and Method for Pipeline Conditioning & Freezing Point Suppression," which is fully incorporated herein by reference, describes the use of aqueous metal ion formate salt compositions, such as potassium formate, as hydrate inhibitors. Hydrate-inhibiting solutions may be added to a pipeline system after a pipeline pig has removed bulk water from the pipeline system. Such solutions act to depress the freezing point of hydrates thereby reducing the formation thereof. Alternatively, the hydrate-inhibiting solution may be added to the water used to hydrotest the pipeline as a conditioner to prevent hydrate formation.

Another method to remove bulk and/or residual water from pipelines includes passing a series of pipeline pigs, alternating with slugs of a hydrate-inhibiting solution, through the pipelines. Using multiple, separated slugs of the solution produces a dilution effect on the relative residual water concentration, thereby leaving any residual liquid with a relatively high concentration of the hydrate-inhibiting solution.

Each of the foregoing methods has drawbacks. The use of vacuum pumps involves expensive equipment and may take considerable amounts of time to lower the air pressure within the pipeline to below the specified point. Handling and disposal of methanol, which is a flammable material, increases costs. Ethylene glycol is likewise expensive to handle and dispose of due to its toxicity.

The use of potassium formate as a hydrate inhibitor may also present several undesirable results. For example, potassium formate may be relatively expensive. Additionally, potassium formate may be corrosive to pipeline systems. As a further drawback, potassium formate has relatively low solubility at temperatures typically found in subsea pipeline systems, and in certain cases, over-land pipeline systems.

The present disclosure is directed to overcoming, or at least reducing the effects of, one or more of the drawbacks set forth above.

SUMMARY

An embodiment of the present disclosure is directed to a method for reducing hydrate formation in a hydrocarbon production pipeline system. The method comprises introducing an aqueous composition of an acetate salt into the pipeline system, and flowing a hydrocarbon through the pipeline system. The acetate salt concentration in the aqueous composition is adequate to reduce the formation of hydrates during hydrocarbon flow compared to hydrate formation that would occur if the acetate salt had not been introduced.

DETAILED DESCRIPTION

In the following detailed description, specific embodiments are disclosed in which the invention may be practiced. These embodiments are described in sufficient detail to enable those skilled in the art to practice the invention, and it is to be understood that other embodiments may be utilized and that various changes may be made without departing from the spirit and scope of the present invention. The following detailed description is, therefore, not to be taken in a limiting sense.

The present disclosure relates to compositions and methods for reducing formation of hydrates within pipeline systems, including subsea pipeline, over-land pipeline, or combinations thereof. The term "reducing" can include inhibiting, mitigating, or entirely preventing. The composition includes an aqueous solution of one or more acetate salts or other organic salts as a hydrate inhibitor. The acetate salt may be sodium acetate, potassium acetate, or other acetate salts having the ability to depress the freezing point of hydrates or otherwise reduce hydrate formation. The term "acetate salt" as used herein includes either salts in solid form or dissociated in solution. The compositions disclosed herein may be used as hydrate inhibitors in pipeline systems during pre-commissioning activities (such as hydrotesting, conditioning, or dewatering), commissioning activities (such as introducing production fluids into pipeline systems), operating the pipeline systems, or any other applications wherein ambient conditions may predispose formation of hydrates.

During certain pre-commissioning operations of a pipeline system, water may be pumped into the pipeline system and pressurized to test the pipeline system for leaks. Pre-commissioning operations include activities carried out after initial construction, repair, or other phases of work on a pipeline system prior to commencing normal operation of the pipeline. Such a test, generally known as hydrotesting, subsequently leaves water remaining in the pipeline system. The bulk water may be removed from the pipeline system by pushing one or more pipeline pigs through the pipeline system, but residual water may remain. The residual water in the pipeline may later lead to hydrate formation during operation of the pipeline. To reduce hydrate formation, an organic salt, such as an acetate salt, may be mixed with the hydrotesting water supply to precondition the water prior to pumping the water into the pipeline system. Any residual conditioned water left in the pipeline system after bulk dewatering may have an effective concentration of the acetate salt, which acts to prevent the formation of hydrates within the pipeline system.

Suitable ions for use in an organic salt, as disclosed herein, may include alkali metal ions, alkaline metal ions, transition metal ions, lanthanide metal ions, polyatomic or organic ions, and mixtures or combinations thereof. The alkali metal ions are selected from the group consisting of $Li^+$, $Na^+$, $K^+$, $Rd^+$, $Cs^+$, and mixtures or combinations thereof. The alkaline metal ions are selected from the group consisting of $Mg^{2+}$, $Ca^{2+}$, $Sr^{2+}$, $Ba^{2+}$, and mixtures or combinations thereof. In certain embodiments, the transition metal ions are selected from the group consisting of $Ti^{4+}$, $Zr^{4+}$, $Hf^{4+}$, $Zn^{2+}$, and mixtures or combinations thereof. In certain embodiments, the lanthanide metal ions are selected from the group consisting of $La^{3+}$, $Ce^{4+}$, $Nd^{3+}$, $Pr^{2+}$, $Pr^{3+}$, $Pr^{4+}$, $Sm^{2+}$, $Sm^{3+}$, $Gd^{3+}$, $Dy^{2+}$, $Dy^{3+}$, and mixtures or combinations thereof. In certain embodiments, polyatomic or organic ions are selected from the group consisting of $NH_4^+$.

Likewise, other pre-commissioning activities may be completed with water conditioned with an acetate salt so that any residual water has an effective concentration of the acetate salt to prevent the formation of hydrates within the pipeline system.

To dewater a pipeline that has bulk and/or residual water, slugs, comprising an aqueous solution having an initial concentration of acetate salt, may be added to a pipeline system after one or more pipeline pigs have removed any bulk water. Separated slugs of the aqueous solution may imbibe residual water and leave behind progressively higher concentrations of the acetate salt solution. The slugs may be separated from each other by other fluids or pipeline pigs.

In an embodiment, the separated slugs may also be given progressively increasing initial acetate salt concentrations so that each subsequent slug has a relatively higher acetate salt concentration than the acetate salt concentrations of the residual solutions within the pipeline. In other words, the residual solution within the pipeline progressively increases in concentration with each slug that passes through the pipeline system, and each subsequent slug is given a relatively higher concentration than the residual solution.

The resulting conditioned solution remaining within the pipeline, due to its effective acetate salt concentration, may reduce hydrate formation within the pipeline compared to hydrate formation that would occur without the acetate salt solution. The acetate salt concentration in the resulting conditioned solution may be lower than the acetate salt concentration of the slugs initially added to the pipeline system because of the mixing with residual water. Accordingly, in an embodiment, the slugs of aqueous acetate salt solution added to the pipeline system may be given higher concentrations than the desired effective concentration.

The result of the dewatering methods described above is that the residual solution in the pipeline system has an effective concentration of acetate salt. Such a residual aqueous acetate salt solution has an effective concentration if it effectively reduces the formation of hydrates within the pipeline system to within desired limits. Ambient conditions such as pressure and temperature in a pipeline system may determine the propensity of hydrate formation. As a result, the effective concentration depends on ambient conditions in each situation.

One of ordinary skill in the art having the benefit of this disclosure would understand that for ambient conditions that have a relatively high propensity for hydrate formation (for example colder ambient temperatures), the corresponding effective concentration of the hydrate-inhibiting solution is generally relative higher. Thus, one of ordinary skill in the art having the benefit of this disclosure is able to determine the effective concentration of an acetate salt solution based on ambient factors such as temperature, pressure, or the like. Further, due to differences in the effectiveness on hydrate reduction by various acetate salts, the type of acetate salt used in solution may affect the effective concentration for any particular conditions.

Further, the composition of production fluid, such as natural gas, to be pumped through a pipeline system may affect the propensity of hydrate formation. Thus, one of ordinary skill in the art having the benefit of this disclosure may determine the effective concentration of the hydrate-inhibiting solution based in part on the composition of production fluid to be pumped through the pipeline system.

As an example, but not to limit the scope of this disclosure, in certain conditions, an aqueous sodium acetate solution may have an effective concentration within the range from about 0.1% to about 50% of saturation of sodium acetate in water at ambient conditions. In other conditions, an aqueous sodium acetate solution may have an effective concentration within the range from about 50% of saturation of sodium acetate in water at ambient conditions to about 0.25% less than saturation of sodium acetate in water at ambient conditions.

As an example, but not to limit the scope of this disclosure, in certain conditions, an aqueous potassium acetate solution may have an effective concentration within the range from about 0.1% to about 50% of saturation of potassium acetate in water at ambient conditions. In other conditions, an aqueous potassium acetate solution may have an effective concentration within the range from about 50% of saturation of potassium acetate solution in water at ambient conditions to about 0.25% less than saturation of potassium acetate solution in water at ambient conditions.

One of ordinary skill in the art having the benefit of this disclosure would be able to determine the effective acetate salt concentration in aqueous solution, which may be any suitable concentration, based on the ambient conditions, as described above, and the desired reduction in hydrate formation.

EXAMPLES: CORROSIVENESS TESTING

To test and compare the corrosive effects of acetate salt solutions against a formate salt solution on carbon steel, three solutions were mixed: 1) sodium acetate solution with 76 grams of sodium acetate per 100 milliliters of water; 2) potassium acetate solution with 216 grams of potassium acetate per 100 milliliters of water; and 3) potassium formate solution with 32.8 grams of potassium formate per 100 milliliters of water. The concentration of each salt in aqueous solution was based on the saturation of that particular salt at 32° F. (0° C.). The saturation solubility of each salt is represented in Table 1, below.

TABLE 1

| Solubility Data. | |
| --- | --- |
| Salt | Solubility (g/100 mL) at 0° C. |
| Sodium Acetate | 76 |
| Potassium Acetate | 216 |
| Potassium Formate | 32.8 |

The corrosive effects of each solution were tested by immersing steel coupons for predetermined lengths of time, followed by measuring the amount of corrosion on each coupon by comparing a before-immersions mass of each coupon with an after-immersion mass.

The coupons were purchased from Metal Samples, Inc. and are ASTM 1010 carbon steel, a typical component material of pipeline systems. The samples were prepared, dried, and weighed prior to immersion in the solutions.

A set of nine small staining cells were assembled—three having a solution of sodium acetate, three having a solution of potassium acetate, and three having a solution of potassium formate. In each staining cell, three prepared coupons were immersed halfway, each coupon being held upright by a TEFLON slotted ring stand.

One set of coupons was removed from each solution at one week, one set at one month and the final set at six months. Upon removal, the coupons were cleaned and dried. After drying, the coupons were weighed and the weight loss recorded. Corrosion rates in millimeters per day and pounds per square foot per day were calculated and recorded. The corrosion rate results are depicted in Table 2, below.

TABLE 2

| Corrosion Data | | |
| --- | --- | --- |
| Salt | mm/year | lb/ft$^2$/day |
| 1 Week Exposure | | |
| Sodium Acetate | 0.0103 | <0.0001 |
| Potassium Acetate | 0.0055 | <0.0001 |
| Potassium Formate | 0.1404 | 0.0006 |
| 1 Month Exposure | | |
| Sodium Acetate | 0.0017 | <0.0001 |
| Potassium Acetate | 0.0002 | <0.0001 |
| Potassium Formate | 0.1327 | 0.0006 |
| 6 Month Exposure | | |
| Sodium Acetate | 0.0001 | <0.0001 |
| Potassium Acetate | 0.0003 | <0.0001 |
| Potassium Formate | 0.1481 | 0.0007 |

The results of the corrosiveness testing show that the potassium formate solution is measurably more corrosive on the steel coupons than the sodium acetate and potassium acetate solutions. Corrosion of pipeline may potentially cause significant and costly damage to the pipeline systems, and may even lead to catastrophic failure. Accordingly, such acetate salt solutions may be advantageously used to prevent and/or inhibit hydrate formation in pipeline systems while resulting in less corrosion to the pipeline systems relative to potassium formate solutions.

In addition to hydrate prevention, other properties of acetate salt solutions disclosed herein may provide advantages over prior art methods and compositions. For example, acetate salt solutions described herein may be obtained and disposed of at lower costs than prior art hydrate prevention compositions, thereby increasing the economic feasibility of using such compositions. Particularly, sodium acetate can typically be purchased at a substantially lower price than potassium formate. Further, the acetate salts disclosed herein have increased solubility in water relative to potassium formate, as illustrated by the data of Table 1, allowing for higher concentrations of acetate salt solutions, which may lead to more effective performance in inhibiting hydrate formation within pipeline systems.

Additional advantages of the compositions and methods of the present disclosure over prior art compositions and methods may include one or more of the following: long term stability, increased availability, lower toxicity and/or impact to the environment, lower corrosiveness on pipeline systems, lower cost, and increased solubility at typical operating temperatures. Thus, the acetate salt solutions disclosed herein are better suited than known prior art methods and compositions to condition and treat pipeline systems to prevent and mitigate hydrate formations.

While the disclosure has been provided in detail and with reference to specific embodiments thereof, it will be apparent to one skilled in the art that various changes and modifications can be made therein without departing from the spirit and scope thereof. Accordingly, it is intended that the present disclosure covers modifications and variations provided they come within the scope of the appended claims and their equivalents.

What is claimed is:

1. A method comprising:
prior to using a hydrocarbon production pipeline system for flowing hydrocarbon, introducing an aqueous composition comprising an acetate salt into the hydrocarbon production pipeline system, wherein the aqueous composition introduced into the hydrocarbon production pipeline system has a concentration of the acetate salt in water ranging from about 0.1% to about 50% of saturation of the acetate salt in water at ambient conditions before introducing the aqueous composition into the hydrocarbon production pipeline system;
ceasing the introduction of the aqueous composition and leaving a residue of the aqueous composition in the hydrocarbon production pipeline system; and
after leaving the residue of the aqueous composition, flowing a hydrocarbon through the hydrocarbon production pipeline system,
wherein the concentration of the acetate salt in the aqueous composition residue is adequate to reduce the formation of hydrates in the hydrocarbon production pipeline system during hydrocarbon flow compared to hydrate formation that would occur if the acetate salt had not been introduced.

2. The method of claim 1, further comprising:
    passing a pipeline pig through the hydrocarbon production pipeline system, thereby removing bulk water from the hydrocarbon production pipeline system.

3. The method of claim 1, wherein the aqueous composition comprises at least one ion selected from the group consisting of $Li^+$, $Na^+$, $K^+$, $Rd^+$, $Cs^+$, $Mg^{2+}$, $Ca^{2+}$, $Sr^{2+}$, $Ba^{2+}$, $Ti^{4+}$, $Zr^{4+}$, $Hf^{4+}$, $Zn^{2+}$, $La^{3+}$, $Ce^{4+}$, $Nd^{3+}$, $Pr^{2+}$, $Pr^{3+}$, $Pr^{4+}$, $Sm^{2+}$, $Sm^{3+}$, $Gd^{3+}$, $Dy^{2+}$, $Dy^{3+}$, $NH_4^+$, and mixtures or combinations thereof.

4. The method of claim 1, wherein the acetate salt is sodium acetate.

5. The method of claim 1, wherein the acetate salt is potassium acetate.

6. The method of claim 1, wherein the hydrocarbon production pipeline system is a subsea hydrocarbon production pipeline system.

7. The method of claim 1, wherein the hydrocarbon production pipeline system is an over-land hydrocarbon production pipeline system.

8. The method of claim 1, wherein introducing the aqueous composition comprising the acetate salt into the hydrocarbon production pipeline system comprises pumping at least first and second separated slugs of the aqueous composition into the hydrocarbon production pipeline system.

9. The method of claim 8, further comprising passing at least one pipeline pig through the hydrocarbon production pipeline system between the first and second separated slugs of the aqueous composition.

10. The method of claim 5, wherein introducing the aqueous composition comprising potassium acetate into the hydrocarbon production pipeline system comprises pumping at least first and second separated slugs of the aqueous composition into the hydrocarbon production pipeline system.

11. The method of claim 10, further comprising passing at least one pipeline pig through the hydrocarbon production pipeline system between the first and second separated slugs of the aqueous composition.

* * * * *